Figure 1:
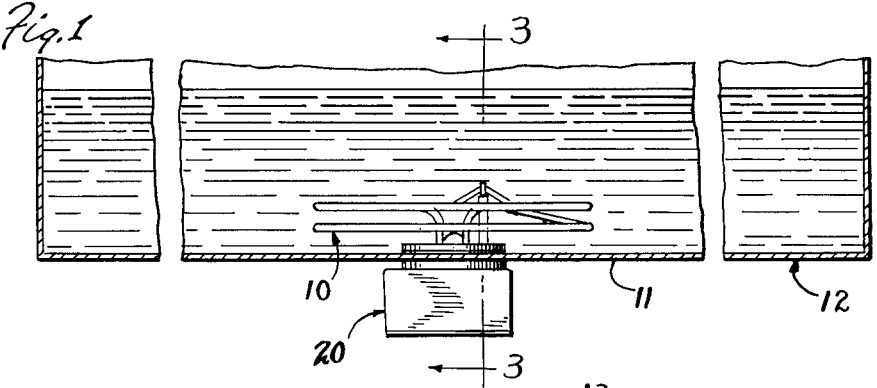

March 28, 1961  J. F. VOLKER  2,977,454

ELECTRIC IMMERSION HEATER

Filed Nov. 12, 1959  2 Sheets-Sheet 1

INVENTOR.
John F. Volker
BY
Attorney

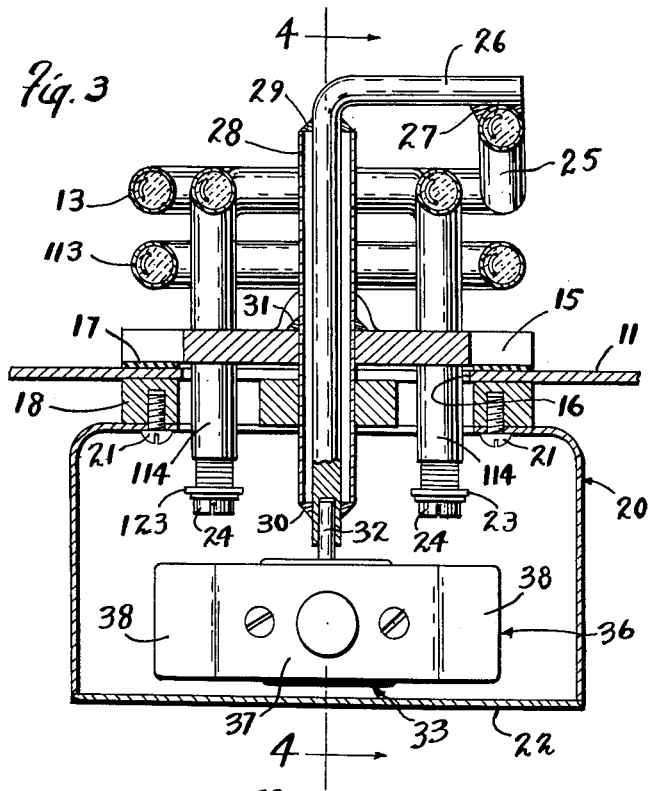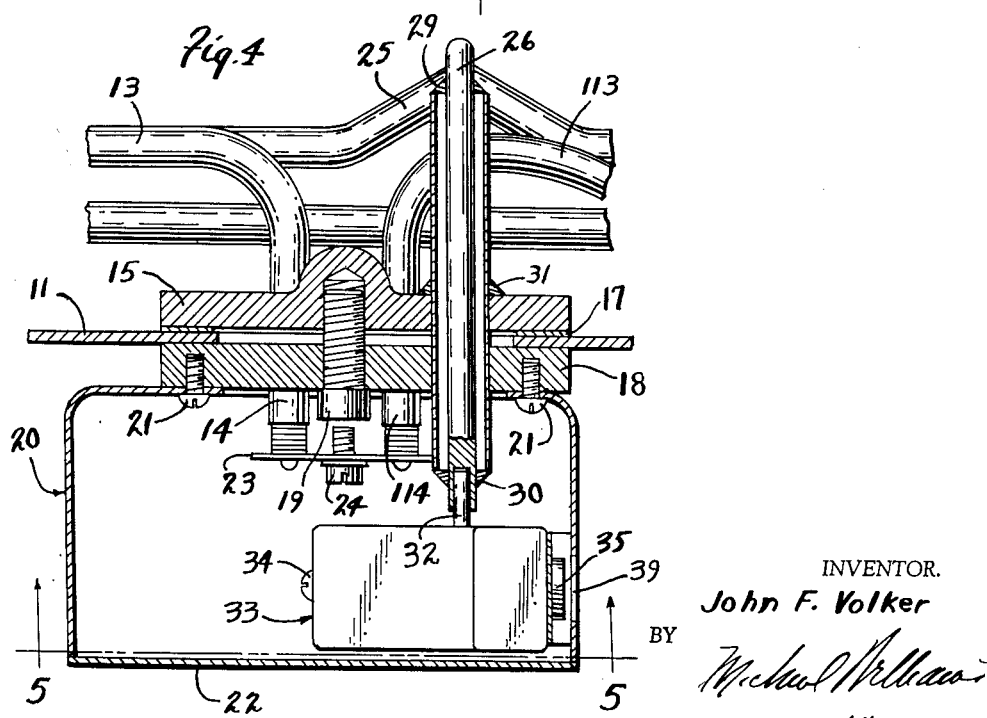

United States Patent Office 2,977,454
Patented Mar. 28, 1961

2,977,454

ELECTRIC IMMERSION HEATER

John F. Volker, Pittsburgh, Pa., assignor to Edwin L. Wiegand Company, Pittsburgh, Pa.

Filed Nov. 12, 1959, Ser. No. 852,569

4 Claims. (Cl. 219—38)

The present invention relates to electric heating, more particularly to an electric heater assembly adapted for immersion in a liquid to be heated, and the principal object of the invention is to provide new and improved assemblies of such character.

In the interest of efficiency, economy and rapid heating, it is desirable that electric resistance immersion heaters be designed with a relatively high, watt density; that is, it is desirable that heat output per unit area of the heat producing part of the heater be quite high. As a consequence, heat output of the heater is frequently so high that if it is energized in air instead of in the liquid to be heated, its temperature will rapidly rise to the point where the heater will burn itself out. Normally, however, since the heater is immersed in the liquid to be heated, its heat will rapidly be dissipated to the liquid and thus the heater will be maintained at a sufficiently low temperature that it will not become damaged.

The present invention has as a primary object the provision of an electric immersion heater which, although it has sufficiently high heat output that it would be permanently damaged in but a few moments were it energized while not completely immersed in the liquid to be heated, is nevertheless protected against damage if it is so energized. Thus, the present invention is particularly suited for immersion heating applications of the type wherein the level of the liquid being heated may frequently drop below the top of the heater. Other advantages of the present invention will readily become apparent from a study of the following description and from the drawings appended hereto.

In the drawings accompanying this specification and forming a part of this application there is shown, for purpose of illustration, an embodiment which the invention may assume, and in these drawings:

Figure 1 is a broken, sectional view taken through a container in whose bottom wall is mounted a heater of the present invention.

Figure 2:
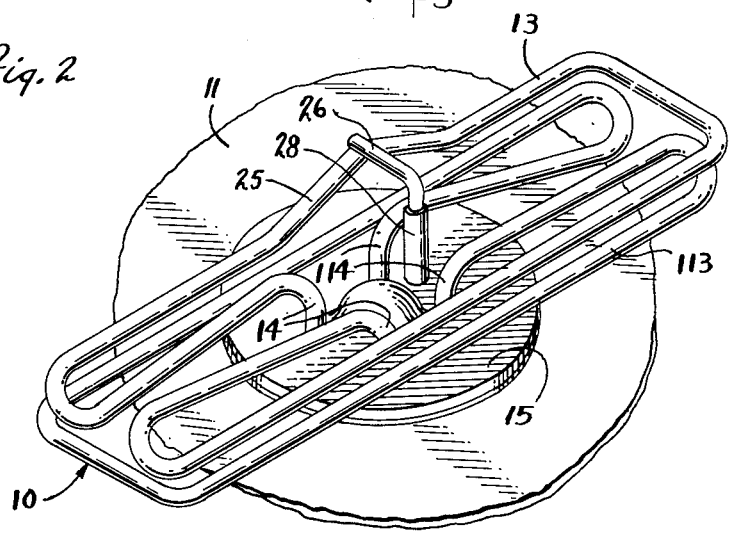
Figure 5:
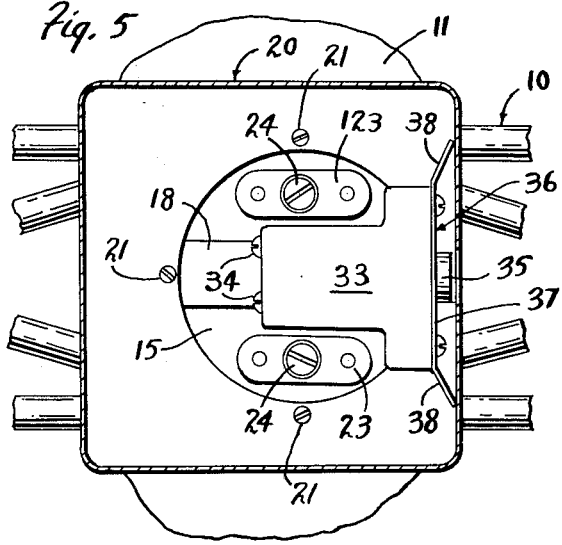

Figure 2 is an enlarged, fragmentary, perspective view of a portion of the bottom wall of the container and of the heater supported thereby, Figure 3 is an enlarged fragmentary sectional view of the heater generally corresponding to the line 3—3 of Figure 1, Figure 4 is a fragmentary sectional view generally corresponding to the line 4—4 of Figure 3, and Figure 5 is a reduced size, fragmentary sectional view generally corresponding to the line 5—5 of Figure 4.

With reference to Figure 1, the heater 10 of the present invention is, for purpose of illustration, shown mounted in the bottom wall 11 of a shallow tank 12 which may form a part of a steam table. This tank is adapted to contain a quantity of water which is kept hot by means of the heater 10, the steam table functioning in the well-known manner to keep food at serving temperature for extended periods of time. Although not shown, the water in the tank may be maintained at a desired temperature by means of a conventional thermostat device which responds to the water temperature and which energizes the heater when the water drops below a desired temperature and which de-energizes the heater when the water rises to a desired temperature.

Normally, the water level in the tank 12 is supposed to be maintained above the uppermost part of the heater. This may be done by adding water which is lost by evaporation either automatically, as by means of a float valve, or manually, by operation of a suitable valve, whenever observation of the water level indicates it is becoming dangerously low. Unfortunately, float valves malfunction and careless operators fail to replenish the water supply when necessary; accordingly, the present invention functions to prevent costly damage to the heater and the inconvenience attendant with replacing burned out heaters.

Briefly, the present embodiment comprises a pair of elongated, tubular sheathed electric resistance heating elements 13, 113 each having an intermediate, heat-generating portion and terminal end portions 14, 114 for conducting electrical energy to respective heat-generating portions. As herein disclosed, elements 13, 113 are of the well-known type wherein a coiled resistor conductor is disposed within an intermediate portion of a metallic tubular sheath filled with compacted, electric-insulating, heat-conductive material. The ends of the conductor aforesaid are electrically connected with terminal pins disposed within respective terminal end portions of the sheath and which pins extend beyond respective sheath ends for connection to a source of electrical energy.

In the present embodiment, the elements 13, 113 are arranged with their heat-generating, intermediate portions providing a generally flat, compact configuration which will lie closely adjacent the bottom wall 11 of the tank 12 and with their terminal ends 14, 114 grouped together in side-by-side, adjoining relation. For a purpose to appear, terminal ends 14, 114 extend through respective apertures in a disk-like, circular metallic flange 15 and are brazed or otherwise secured thereto to provide a leak-proof, structurally integral assembly therewith.

As best seen in Figure 3, the tank wall 11 is apertured at 16 to pass the element terminal legs 14, 114, the flange 15 overlying the aperture 16 on the inner side of the tank wall 11 for a purpose to appear. Means are provided for drawing the flange 15 against the tank wall 11, or more accurately, against an apertured gasket 17 interposed between the flange and the wall to prevent leakage therebetween, such means comprising an apertured clamping plate 18 which overlies the exterior of wall 11. A capscrew 19 (see Figure 4) passes through a central aperture in plate 18 and is threaded into a central aperture in flange 15 for drawing the plate and the flange together.

Means are provided for enclosing the free ends of the element terminal portions 14, 114 and for another purpose to be disclosed, such means comprising an electrical outlet box, or housing, 20 secured to the underside of plate 18 by screws 21. Housing 20 is, of course, apertured to pass the terminal portions 14, 114, and a removable cover plate 22 provides access to the interior of the housing to permit the necessary electrical connections to be made to the heating elements. At the present time, the heating elements 13, 113 are adapted to be electrically connected in parallel relation; accordingly, the terminal pin projecting from one of the element terminal ends 14 is connected to the terminal pin projecting from one of the element terminal ends 114 by means of a terminal plate 23 while the terminal pin of the other terminal end 14 is connected to the terminal pin of the other terminal end 114 by means of a terminal plate 123. Each terminal plate 23, 123 carries a screw 24 which provides for securing electrical leads (not shown) thereto.

Returning to that portion of the heater assembly disposed within the tank, one of the elements, herein shown to be element 13, has a small, loop-like portion 25 which projects above the otherwise uppermost portion of the two elements. Secured to the uppermost part of element portion 25 (as best seen in Figure 3) is an L-shaped rod 26 of high, heat-conductive material such as copper or brass. Rod 26 is in thermal transfer relation with element portion 25, the connection therebetween preferably being effectuated by brazing or the like at 27. Rod 26 extends downwardly through oversize apertures in the flange 15 and the plate 18 and terminates within the housing 20.

Surrounding the upright leg of rod 26 is a tube 28 which extends from a rod portion on about the same level as element portion 25 to within the housing 20. The upper end of tube 28 is brazed or the like to rod 26 at 29 and an intermediate portion of the tube is brazed to flange 15 at 31 to provide leakproof junctures at respective places. As herein shown, the lower end of tube 28 is also brazed to the rod 26 as shown at 30 to maintain the rod and the lower end of the tube in concentric relation; however, it will be apparent that the lower end of the tube need not be brazed to the rod as shown but could be maintained concentric therewith by forming the lower end of the tube with a reduced diameter portion which closely engages the rod. As will later appear, tube 28 insulates the rod 26 against heat loss to the water within the tank and to the flange 15.

Referring to Figures 3 and 4, the lower end of rod 26 provides a longitudinally extending recess for closely receiving a pin 32 of a heat responsive switch 33 disposed within the housing 20. Such switch need not be described in detail since it is a commercially available item; however, it is to be understood that the switch is constructed to pass current between its terminal screws 34 (Figure 5) until such time as pin 32 transmits sufficient heat to the interior of the switch to cause its internal contacts to open and break the electrical connection between its terminal screws. Upon cooling of pin 32, electrical connection between the terminal screws can be reestablished by pressing a reset button 35 which will once again close the internal switch contacts until such time as the temperature of pin 32 again rises to a preset value.

It is presently preferred to resiliently maintain switch 33 within the housing 20 for two reasons. Firstly, the resilient retention of the switch provides for its ready assembly and disassembly with the housing. Secondly, and more importantly, such retention of the switch insures that its pin 32 will be removably retained in good thermal contact with the lower end of rod 26.

As herein disclosed, a leaf spring member 36 (see especially Figure 5) has its intermediate portion 37 secured to the switch 33 and has angularly disposed end portions 38 resiliently engaged with an adjoining side wall of housing 20. Spring 36 has an aperture for passing the switch reset button 35, the side wall aforesaid of housing 20 being apertured at 39 to provide access to the reset button.

Although not shown, it is to be understood that switch 33 will be wired in series with the elements 13, 113; that is, one lead of the power line will be connected to one of the switch terminal screws 34, the other lead of the power line will be connected to one of the terminal plates (either 23 or 123), and the other terminal plate connected to the other terminal screw 34 by a short lead.

Assuming the heater 10 to be installed in a water filled tank as seen in Figure 1 and connected to a source of electrical energy as previously described, operation will be as follows: So long as the heat generating portion of the heater remains immersed in water, there is no limit upon the length of time which it may remain energized since, with the heater thus immersed, the surrounding water will carry off the heat generated by the heater and thus keep its temperature below the danger point. With the element temperature thus held to a safe level, switch 33 will not operate to break the power circuit to the heating elements.

If now, however, the water level falls below the part 25 of element 13, continued energization of the element will cause this part to rapidly rise in temperature since with such part exposed to air, the water can no longer carry away its heat. As the element part 25 increases in temperature, the temperature of the rod 26 secured to the element will also increase. Since the rod 26 is of excellent heat-conductive material, its lower end will be heated practically as much as its upper end. When the lower end of rod 26 reaches a certain temperature, as sensed by the switch pin 32, the switch 33 will function to interrupt the power circuit to the heating elements. It will be clear that the switch will be so designed that it will interrupt the power circuit before the heating element 13 reaches a temperature sufficient to cause permanent damage thereto.

Following interruption of the power circuit to the heating elements as above described and when the latter have sufficiently cooled, reset button 25 may be pressed to re-establish the electrical power circuit to the element. In the event the water level is still low, the switch 33 will operate again to prevent damage to the heating elements; however, if the level is now above the elements, the latter will remain energized so long as the water requires heating.

Particular attention is directed to the previously mentioned tube 28 which partially encloses the rod 26 and insulates it from the water below the element loop 25 and from the flange 15. Were the rod not so insulated, considerable of the heat absorbed by the rod 26 from the element 13 would be passed to the water and to the flange instead of to the switch pin 32; accordingly, the switch might fail to operate to interrupt energization of the heater elements until they have reached a dangerously high level.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. An electric heater assembly for heating liquid in a container comprising an elongated tubular sheathed electric resistance heating element having an intermediate heat-generating portion for disposition within the container beneath the normal liquid level and having terminal end portions extending in side-by-side relation through an aperture in the container to the exterior thereof for conducting electrical energy to said heat-generating element portion, a flange extending radially of said element terminal end portions for overlying and closing the container aperture, a thermally responsive switch supported by said flange exteriorly of the container to interrupt current flow to said element when its temperature rises to a predetermined level, a heat-conductive member extending from said switch through an enlarged aperture in said flange and through the liquid in the container to an uppermost heat-generating element portion and in thermal transfer relation with the latter for conducting heat from said element to said switch, and a tubular member through which said heat-conductive member extends for protecting the latter against heat loss to the liquid in the container and to said flange, said member being in liquid-tight engagement with said flange to prevent liquid passage through said enlarged flange aperture and extending from said flange to a portion of said heat-conductive member adjacent its connection with said element heat-generating portion.

2. The construction of claim 1 wherein said tubular member has an internal cross-sectional size greater than the external cross-sectional size of said heat-conductive member to provide a heat-insulating annular dead air space therebetween and wherein said tubular member is in liquid-tight engagement with said heat-conductive member portion.

3. The construction of claim 1 wherein a relatively small part of the heat-generating portion of said element projects above the remainder of such element portion so as to first emerge from the liquid when it drops below its normal level and wherein said heat-conductive member is in direct thermal transfer relation with an upwardly directed surface of said element part.

4. An electric heater assembly for heating liquid in a container comprising an elongated tubular sheathed electric resistance heating element having an intermediate heat-generating portion for disposition within the container beneath the normal liquid level and having terminal end portions extending in side-by-side relation through an aperture in the container to the exterior thereof for conducting electrical energy to said heat-generating element portion, a first flange extending radially of said element terminal end portions and through which the latter extend in liquid-tight relation, said flange being disposed within the container and overlying and closing the aperture therein, a second flange removably secured to said first on the exterior of the container for drawing said first flange to liquid-tight relation with the container, a housing secured to said second flange and enclosing the free ends of said element terminal end portions, a thermally responsive switch within said housing to interrupt current flow to said element when its temperature rises to a predetermined level, a heat-conductive member extending from said switch through an enlarged aperture in said first flange and through the liquid in the container to a uppermost heat-generating element portion and in thermal transfer relation with the latter for conducting heat from said element to said switch, and a tubular member through which said heat-conductive member extends for protecting the latter against heat loss to the liquid in the container and to said first flange, said tubular member having an internal cross-sectional size greater than the external cross-sectional size of said heat-conductive member to provide a heat-insulating annular dead-air space therebetween and said tubular member being in liquid-tight engagement with said first flange to prevent liquid passage through said enlarged aperture thereof and extending from said first flange to a portion of said heat-conductive member adjacent its connection to said element heat-generating portion and in liquid-tight engagement with the latter.

References Cited in the file of this patent

UNITED STATES PATENTS

| | | |
|---|---|---|
| 1,734,609 | Andrews | Nov. 5, 1929 |
| 2,022,440 | Slough | Nov. 26, 1935 |
| 2,233,615 | Kuhn et al. | Mar. 4, 1941 |
| 2,297,016 | Osterheld | Sept. 29, 1942 |
| 2,767,925 | Arnold | Oct. 23, 1956 |
| 2,802,921 | Miklas | Aug. 13, 1957 |

FOREIGN PATENTS

| | | |
|---|---|---|
| 203,636 | Australia | Sept. 17, 1956 |